(No Model.)
W. F. DONOVAN.
ATTACHMENT OF KNOBS TO THEIR SHANKS.
No. 538,952. Patented May 7, 1895.
FIG.1.
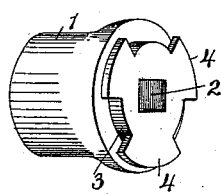 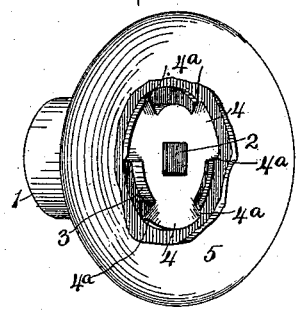
FIG.2.
FIG.3.
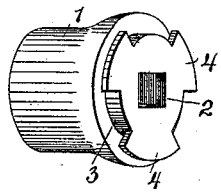 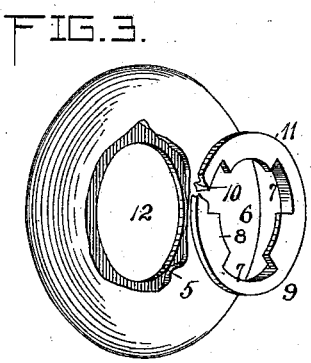
FIG.4.
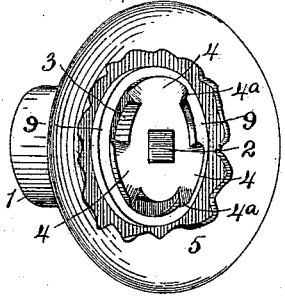
FIG.5.
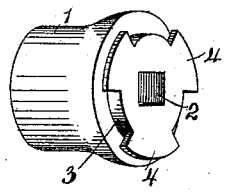 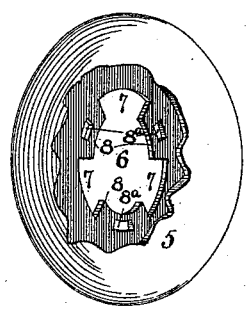
FIG.6.
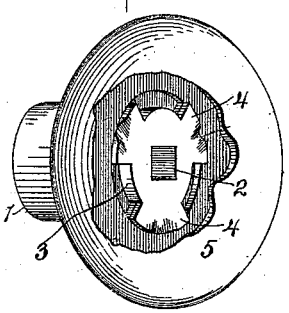
Witnesses.
Walter E. Allen.
Geo. E. Cruree.
Inventor.
William F. Donovan.
By Knight Bros.
Attys.
THE NORRIS PETERS CO., PHOTO-LITHO., WASHINGTON, D. C.

UNITED STATES PATENT OFFICE.

WILLIAM F. DONOVAN, OF STAMFORD, CONNECTICUT, ASSIGNOR TO THE YALE & TOWNE MANUFACTURING COMPANY, OF SAME PLACE.

ATTACHMENT OF KNOBS TO THEIR SHANKS.

SPECIFICATION forming part of Letters Patent No. 538,952, dated May 7, 1895.

Application filed December 4, 1894. Serial No. 530,817. (No model.)

*To all whom it may concern:*

Be it known that I, WILLIAM F. DONOVAN, a resident of Stamford, in the county of Fairfield and State of Connecticut, have invented certain new and useful Improvements in the Attachment of Door-Knobs to Their Shanks, of which the following is a specification.

My invention has for its object to provide a simple but effective connection between the struck-up or sheet-metal door-knob and its shank and consists in certain novel features which will be hereinafter particularly pointed out in the claims, being first fully described with reference to the accompanying drawings, in which—

Figures 1 and 2 represent in perspective the two parts prepared for assembling and connected in the preferred manner. Figs. 3 and 4 are similar views representing the same method of connecting the shank and knob through the medium of an interposed thimble. Figs. 5 and 6 are similar views representing a slight modification in the clinching operation to secure the parts against relative turning.

1 represents the shank, which has the customary longitudinal spindle-opening 2. In my invention, this shank is provided with a neck 3 and segmental radial projections 4.

5 represents the knob with a portion broken away to expose a central opening 6, which is adapted in size to receive the neck 3 on the shank, and has radiating from it flaring recesses 7, corresponding to and in size sufficient to receive the segmental projections 4 on the shank. Between the said recesses 7 are left similarly formed and inwardly extending projections 8. It will readily be seen that the contour of the opening 6, 7, in the knob 5 is such that the specially formed projections on the shank can be inserted, and also that after being thus inserted the shank and knob may be rotated relatively until projections 4, overlap projections 8, as shown in Fig. 2, when it will be impossible to withdraw the shank from the knob. If now the parts can be secured in this engaged position, the attachment will be complete. To provide for thus securing the parts against relative turning, it is simply necessary to depress or strike up the one into engagement with the other. This may be done in any convenient way, such for instance, as by making the parts 4 and 8 of unequal width and turning the corner of one into engagement with the other, as illustrated in Figs. 2 and 4, or by upsetting a portion of one part into a recess formed in the other, as shown by Fig. 6. In Figs. 1 to 4, the outer edges of the projections 4 are made slightly larger than the corresponding parts of the projections 8 and the corners 4ª which are thus left projecting beyond the parts 8 are bent down into recesses 7, so as to embrace said projections 8 and securely lock the parts against further relative rotation.

In Figs. 5 and 6, the parts 8 are formed with recesses 8ª and into them, are upset the edges 4ᵇ of parts 4, so as to lock the shank and knob against relative turning.

Referring to Figs. 3 and 4, it will be seen that instead of making the specially formed opening 6, 7, in the knob 5, such opening may be made in a thimble 9, having a neck 10 and flange 11, and a round hole 12 formed in knob 5 to receive the neck 10. The thimble is then inserted in the opening 12, with its flange on the opposite side to the shank, after which the specially prepared end 3, 4, of said shank is inserted through the corresponding opening 6, 7, in the thimble, then rotated to bring the respective projections 4 and 8 into engagement, and one of the above methods of locking against relative movement resorted to. I have illustrated the forms in which the corners 4ª of projections 4 are bent down as described with reference to Figs. 1 and 2, so that the parts will be united as shown in Fig. 4. This combination of parts may have some advantages, and the parts may be so pressed together in uniting them that the shank will be held against relative turning in the knob, but the method of uniting the shank and knob shown in Figs. 1, 2, 5 and 6, is simpler and the engagement is more positive between the shank and knob, and the connection more secure against turning.

Having thus described my invention, the following is what I claim as new therein and desire to secure by Letters Patent:

1. In an attachment for securing knobs to their shanks, the combination of one part formed with a neck and radial projections, and the other part formed with a central opening and radiating recesses adapted to receive the neck and radial projections; said parts being rotated relatively to bring the radial projections of the one part into engagement with the metal between the radial recesses of the other part and bent down to secure them in engaged position, substantially as herein described.

2. In the attachment of knobs to their shanks, the combination of the shank having a neck and segmental radial projections, and the knob having a central opening with radiating recesses to permit the insertion of the shank, and segmental projections intermediate of said radiating recesses with which the segmental projections on the shank engage when the knob and shank are rotated relatively; the projections on one part being broader than those on the other and having their corners bent down into engagement therewith to prevent disengagement of the parts, as explained.

WILLIAM F. DONOVAN.

Witnesses:
SCHUYLER MERRITT,
GEO. E. WHITE.